United States Patent [19]

Simpson et al.

[11] Patent Number: 5,132,172
[45] Date of Patent: Jul. 21, 1992

[54] PRIMED POLYOLEFIN SURFACES FOR EPOXY ADHESIVES

[75] Inventors: J. Thomas Simpson, Lake Elmo; James J. Kobe, Maplewood; Frank J. Armatis, Jr., Stillwater, all of Minn.

[73] Assignee: Minnesota Mining and Manufacturing Company, St. Paul, Minn.

[21] Appl. No.: 406,810

[22] Filed: Dec. 14, 1989

Related U.S. Application Data

[63] Continuation of Ser. No. 480,073, May 14, 1987, abandoned, which is a continuation-in-part of Ser. No. 872,922, Jun. 11, 1986, abandoned.

[51] Int. Cl.$^5$ ............................ B32B 15/08; B32B 27/08
[52] U.S. Cl. ................................ 428/336; 428/416; 428/500
[58] Field of Search ............... 428/416, 353, 461, 413, 428/304, 336, 500; 427/43; 204/154; 252/429

[56] References Cited

U.S. PATENT DOCUMENTS

| | | | |
|---|---|---|---|
| 3,252,880 | 5/1966 | Magat et al. | 204/154 |
| 3,628,987 | 12/1971 | Nakata et al. | 428/353 |
| 3,868,433 | 2/1975 | Bartz et al. | 428/461 |
| 4,041,192 | 8/1977 | Heger et al. | 427/43 |
| 4,148,839 | 4/1979 | Fydelor | 525/301 |
| 4,179,401 | 12/1979 | Garnett et al. | 252/429 |
| 4,337,116 | 6/1982 | Kauffman et al. | 428/413 X |
| 4,557,784 | 12/1985 | Uekita et al. | 428/416 X |
| 4,563,388 | 1/1986 | Bonk et al. | 428/304 |
| 4,578,310 | 3/1986 | Hatfield | 428/416 X |

OTHER PUBLICATIONS

S. Yamakawa, J. Appl. Polym. Sci, 20, pp. 3057-3072 (1976) Relationship between Adhesive Bond Strength & Surface Composition.
S. Yamakawa et al. (1) Macromolecules, 9, pp. 754-758 (Mar. 1976) Relationship between Adhesive Bond Strength & Surface Structure.
S. Yamakawa et al., (2) Appl. Polymer Sci., 22, pp. 2459-2470 (1978) Oxidative Degradations & Stabilization of Grafted Layers.
S. Yamakawa et al., J. Appl. Polym. Sci., 25, pp. 25-39 (1980) Improvement in Wet Strength.
S. Yamakawa et al. (4), J. Appl. Polym. Sci. 25, pp. 40-49 (1980) Comparison with Other Surface Treatment.

Primary Examiner—Thomas J. Herbert, Jr.
Attorney, Agent, or Firm—Gary L. Griswold; Walter N. Kirn; Carole Truesdale

[57] ABSTRACT

An article is provided which comprises a polyolefin first substrate adhered to a second substrate with an epoxy adhesive. The polyolefin first substrate has graft-polymerized thereto at least one monomer selected from the group consisting of sulfonic and carboxylic acids and alkyl esters thereof containing fewer than eight carbon atoms in the ester group, amides and mono- and di-substituted amides, alcohols, amines, and 5-, 6-, and 7-membered heterocyclic rings having at least one oxygen and/or nitrogen atom in the ring, with the proviso that said monomer contain an ethylenically unsaturated polymerizable moiety. The graft-polymerized monomers are in a layer less than 5 micrometers in thickness and contact the epoxy adhesive.

12 Claims, No Drawings

PRIMED POLYOLEFIN SURFACES FOR EPOXY ADHESIVES

This application is a continuation of Ser. No. 07/480,073, filed May 1987, now abandoned, which is a continuation-in-part of application Ser. No. 06/872,922, filed Jun. 11, 1986, now abandoned.

TECHNICAL FIELD

This invention relates to polyolefin substrates having a primed surface which provides improved bonding of epoxy resin adhesives thereto and a method for adhering primed polyolefin substrates with epoxy resin adhesives.

BACKGROUND

For many years there has existed a desire for polyolefin materials which can be bonded to other materials, e.g., metals, ceramics and wood, or to themselves with epoxy resin adhesives. Bonding of such materials with epoxy resin adhesives is often desirable, particularly when the bonded material is to be subjected to conditions of high temperature and high humidity.

Untreated polyolefin substrates, e.g., polyethylene, polypropylene or polyallomer which is a copolymer of polyethylene and polypropylene, are generally unreceptive to epoxy adhesives and much effort has been expended in the search for a technique which will easily and reliably increase adhesion without significantly changing the properties of the substrate. Surface modification techniques for enhancing adhesive bonding which have been examined are treatment with helium gas plasma, oxygen gas plasma and chromic acid. These treatments and other surface modification procedures have a common shortcoming in poor durability. Light rubbing of the surface causes a decrease in the effect, the altered surface being easily abraded.

Irradiation of polyolefin substrates, such as with an electron beam, to improve the adhesion of various coatings is also known and has been disclosed in U.S Pat. No. 4,041,192 (Heger et al.), U.S. Pat. No. 4,148,839 (Fydelor), U.S. Pat. No. 3,252,880 (Magat et al.) and U.S. Pat. No. 4,179,401 (Garnett et al.).

Polyolefin substrates have been provided with a treated surface for improved adhesion of pressure-sensitive adhesives. Such pressure-sensitive adhesives include rubber-type adhesives such as those based on natural rubber and synthetic rubbers, e.g., styrene-butadiene, chloroprene, neoprene, and isobutylene rubbers and synthetic resin-type adhesives such as acrylic, polyvinyl chloride, polyvinyl acetate, and polyvinyl butyral adhesives. U.S. Pat. No. 3,628,987 (Nakata et al.) discloses a pressure-sensitive adhesive film wherein the film surface to which the adhesive is adhered has graft-polymerized thereto a vinyl monomer or diene monomer, the adhesive having a solubility parameter near that of polymers of the vinyl or diene monomer. U.S. Pat. No. 4,563,388 (Bonk et al.) discloses a polyolefin substrate having graft-polymerized thereto at least one monomer selected from the group consisting of acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone, and firmly adherently bonded to the graft-polymerized monomer an acrylic type normally tacky and pressure-sensitive adhesive.

A series of articles, "Surface Modification of Polyethylene by Radiation-Induced Grafting for Adhesive Bonding. I. Relationship Between Adhesive Bond Strength and Surface Composition," (S. Yamakawa, *J. Appl. Polym Sci*, 20, 3057–3072 (1976); "II. Relationship between Adhesive Bond Strength and Surface Structure," (S. Yamakawa et al, *Macromolecules*, 9, 754–758, (1976); "III. Oxidative Degradation and Stabilization of Grafted Layer," (S. Yamakawa et al., *J. Appln. Polym. Sci.*, 22, 2459–2470 (1978); "IV. Improvement in Wet Peel Strength," (S. Yamakawa et al., *J. Appl. Polym. Sci.*, 25, 25–39 (1980), and "V. Comparison with Other Surface Treatments," (S. Yamakawa et al., *J. Appl. Polym. Sci.*, 25, 40–49 (1980), disclose grafting of methyl acrylate (followed by saponification), vinyl acetate, acrylic acid, acrylamide, and methylolacrylamide to polyethylene by vapor-phase mutual grafting or liquid-phase preirradiation at thicknesses of grafted monomer of more than 10 micrometers to improve adhesion of epoxy adhesives.

SUMMARY

The present invention provides a polyolefin first substrate firmly adhered to a second substrate with an epoxy resin adhesive, said polyolefin first substrate having graft-polymerized thereto at least one monomer selected from the group consisting of sulfonic and carboxylic acids and alkyl esters thereof containing fewer than eight carbon atoms in the ester group, amides and mono- and di-substituted amides, alcohols, amines, epoxides, and 5-, 6-, and 7-membered heterocyclic rings having at least one oxygen and/or nitrogen atom in the ring, with the proviso that said monomer contain an ethylenically unsaturated polymerizable moiety and that the graft-polymerized monomers are in a layer less than 5 micrometers in thickness and contacting said epoxy resin adhesive.

The present invention also provides a method for adhering a polyolefin first substrate to a second substrate with an epoxy resin adhesive comprising the steps of a) coating on said polyolefin first substrate a liquid monomer selected from the group consisting of sulfonic and carboxylic acids and alkyl esters thereof containing fewer than eight carbon atoms in the ester group, amides and nono- and dis-substituted amides, alcohols, amines, epoxides, and 5-, 6-, and 7-membered heterocyclic rings having at least one oxygen and/or nitrogen atom in the ring, in a layer less than 5 micrometers in thickness; with the proviso that said monomer contain an ethylenically unsaturated polymerizable moiety b) irradiating the coated substrate with ionizing radiation to graft polymerize said monomer to said substrate;

c) coating an epoxy resin adhesive on at least one of (i) said graft-polymerized monomer surface of said first substrate and (ii) a surface of said second substrate;

d) contacting said surfaces (i) and (ii); and e) curing said epoxy resin adhesive.

Surprisingly excellent peel values, i.e., greater than 25 lb/in (440 N/dm), result when the grafted monomer layer is less than 5 micrometers thick. Good peel adhesion is also retained after exposure to water for a period of about one week.

DETAILED DESCRIPTION

The substrate of the invention is a polyolefin material, i.e., polyethylene, polyalkyl-α-olefins, and blends thereof, such as i.e., polyethylene, polypropylene, or polyallomer which is an ethylene/propylene copolymer. These polyolefin materials can also contain small amounts, i.e., up to about 10 weight percent of modifying monomers, e.g., crosslinkable terpolymers, such as dicyclopentadiene and norborneene, and ionomers which enhance strength, such as acrylic acid. These terpolymers and ionomers are not present on the surface of the polyolefin materials in sufficient quantities to affect epoxy adhesive adhesion to the polyolefin materials.

The thickness of the polyolefin material is determined by the end use of the adhesive-coated product, typical thicknesses being in the range of about 0.025 to about 5.0 millimeters. The polyolefin material may contain additives, such as carbon black, calcium carbonate, silica, titanium dioxide, crosslinking agents, dispersants and extrusion aids, which are known in the art.

Various specific monomers suitable for graft-polymerization onto polyolefin substrates to promote adherence of epoxy adhesives to the substrate include acrylic acid, dimethylacrylamide, diethylacrylamide, dipropylacrylamide, hydroxyethylacrylate, butanedioldiacrylate, hexanedioldiacrylate, diethylaminoethylacrylate, glycidylmethacrylate, isobutylmethacrylate, cyclohexylmethacrylate, trimethylolpropane triacrylate, trimethylolpropane trimethacrylate, pentaerythritol triacrylate, pentaerythritol tetracrylate, hydantoin hexacrylate, 2-vinyl-4,4-dimethylazlactone, and N-vinylpyrrolidone.

The monomer composition generally contains about 60 to about 100 weight percent monomer. The monomer composition applied to the polyolefin substrate may contain various additives such as crosslinking agents, surfactants, alcohols, and acids.

Crosslinking agents, some of which may also be monomers suitable for grafting onto the substrate themselves, may be added to further enhance heat resistance of the product. Examples of useful crosslinking agents include polyethyleneglycol diacrylate, pentaerythritol tetraacrylate, tetraethylene glycol dimethacrylate, trimethylolpropane triacrylate, trimethylolpropane trimethacrylate, allyl methacrylate, 1,6-hexanediol diacrylate, 1,6-hexanediol dimethacrylate, thiodiethylene glycol diacrylate, and triallyl cyanurate. The preferred crosslinking agents include polyethylene glycol diacrylate, tetraethylene glycol dimethacrylate, trimethylol propane triacrylate, and thiodiethylene glycol diacrylate. Crosslinking agents may be present in monomer compositions in amounts of about 0 to about 80 percent by weight, preferably 0 to about 40 percent by weight.

Surfactants may be present in the monomer composition to improve the uniformity of the coating on the substrate.

The thickness of the monomer composition is preferably less than about 5 micrometers, more preferably less than about 1 micrometer and most preferably less than about 0.5 micrometer.

For uniform application of the monomer to the polyolefin substrate, the substrate is preferably treated to enable a polar liquid to wet the surface. This can be achieved by treating the substrate with an oxidizing agent such as nitric acid or chromic acid, or treating the substrate with flame, plasma discharge or corona discharge. The preferred method of treatment is corona discharge.

The monomer may be graft-polymerized to the substrate by use of actinic radiation such as x-rays, beta rays, gamma rays, ultraviolet light, visible light and electron beam irradiation. The preferred method of graft-polymerization is by irradiation with an electron beam. The electron beam dosage is typically greater than about 0.05 Mrads, preferably greater than about 0.5 Mrads, and more preferably in the range of about 2 to about 10 Mrads.

The substrate to which the polyolefin material is to be adhered can be any substrate which bonds well with epoxy adhesives. Such substrates include, for example, metals such as aluminum, steel, galvanized steel, stainless steel, copper, and titanium, plastics, other than polyolefins, such as polycarbonate, polyvinyl chloride, polyester and fiber-reinforced polyester, polymethylmethacrylate, and acrylonitrile-butadiene-styrene, and particularly those plastics which are high-temperature impact modified, natural and synthetic rubbers, such as polychoroprene, styrene-butadiene rubber, and nitrile rubber, ceramics, wood, painted surfaces, glass primed with silane and polyolefin having a monomer graft-polymerized thereto according to the present invention.

Epoxy adhesives useful in the present invention includes any one- or two-part epoxy adhesives as long as the curing temperature required does not exceed the softening temperature of the polyolefin substrate. In use the epoxy adhesive may be applied to either the polyolefin substrate or to the substrate to which the polyolefin material is to be adhered or to both substrates. Typical epoxy adhesives include Scotch-Weld® brand Epoxy Adhesives 1838 and 2216 B/A, each available from Minnesota Mining and Manufacturing Company.

The advantages of the invention are illustrated by the following examples, it being understood that numerous variations will be well within the ability of those skilled in the art.

EXAMPLE 1

Into a polyallomer resin, available from Tennessee Eastman under the trade designation "Tenite" 5321E, was milled 1% carbon black by weight. The composition was then extruded as a sheet having a thickness of about 0.5 millimeter, after which one surface was corona-treated by passing the sheet through a 1 millimeter air gap between a chlorinated polyethylene-coated electrode and a grounded aluminum cylinder. The frequency of the unit was 16 kHz, the total input power being 1.5 kw and the exposure time of the sample being on the order of 0.6–1.0 sec. Over the corona-treated, surface was then applied a blend of 80 parts by weight N,N-dimethyl acrylamide, 20 parts by weight trimethylol propane triacrylate, and 0.5 part by weight of a fluorochemical acrylate oligomer (a wetting and leveling agent commercially available from 3M Company as "FC 430"). The blend, which had a viscosity of 2.3 cps at 25° C., was applied to the corona-treated polyallomer surface using a No. 200 quad knurled gravure roll in combination with a doctor blade, minimizing the coating thickness to less than one micrometer. The coated surface was then exposed to electron beam irradiation at a dosage of about 4 Mrads and a voltage of 150-250 kV in a nitrogen atmosphere. The thickness of the grafted layer was found to be less than 0.4 micrometer using attenuated total reflection-infrared spectroscopy.

A cold-rolled steel panel (4"×12"×0.32" (10 cm×30 cm×0.8 cm), designated 80°-730° F. cold-rolled steel, B 40, unpolished, 17603001, available from Advanced Coating Technologies, Inc., Hillsdale, Mich.) was wiped three times with methyl ethyl ketone to remove any surface oil present. Scotch-Weld ® brand Epoxy Adhesive 1838-L B/A Translucent was prepared by mixing together 6 parts by weight base and 5 parts by weight accelerator. The adhesive was coated on the steel panel and a one-inch wide x six-inch long strip of polyallomer having the N,N-dimethyl acrylamide/trimethylolpropane triacrylate grafted thereto was placed on the adhesive with the grafted surface contacting the adhesive and an end of the polyallomer extending beyond the plate. A 4.5 lb (2 kg) roller was rolled across the steel plate/adhesive/polyallomer composite twice. The composite, in which the epoxy adhesive layer was about 0.004 inch (0.1 mm) thick, was placed in an oven at 170° F. (77° C.) for 2 hours. The oven was then turned off and the composite was allowed to cool overnight (16 hours). Adhesion was determined by pulling the polyallomer from steel plate at a 90° angle and a rate of 12 inches (30 cm) per minute. No adhesive failure occurred The polyallomer adherend failed at a force of about 40 lb/in (700N/dm).

COMPARATIVE EXAMPLES 1-3

In Comparative Examples 1-3, untreated polyallomer, polyallomer which had been corona-treated as in Example 1, and polyallomer which had been corona-treated and subjected to electron beam radiation as in Example 1 but with no monomer present, respectively were tested for adhesion as in Example 1. The results are shown in Table 1.

EXAMPLES 2-19

In Examples 2-19, various monomers set forth in Table 1 were graft-polymerized onto polyallomer as described in Example 1 except that the monomer was applied by wiping the polyallomer with a paper towel moistened with the monomer and the dosage of electron beam irradiation was about 5 Mrads. In each of Examples 2-12 and 14-19, 95 parts by weight of the indicated monomer was mixed with 5 parts by weight trimethylolpropane triacrylate, as crosslinking agent and in Example 13 the trimethylolpropane triacrylate was applied as a 50 weight percent solution in acetone. Composites were prepared as in Example 1 and tested for adhesion. The results are set forth in Table 1.

TABLE 1

| Example | Monomer | Adhesion (N/dm) |
| --- | --- | --- |
| Comp 1 | — | 16 |
| Comp 2 | — | 17 |
| Comp 3 | — | 15 |
| 2 | acrylic acid | PAB* |
| 3 | dimethylacrylamide | PAB |
| 4 | diethylacrylamide | PAB |
| 5 | dipropylacrylamide | PAB |
| 6 | hydroxyethylacrylate | PAB |
| 7 | butanedioldiacrylate | PAB |
| 8 | hexanedioldiacrylate | PAB |
| 9 | diethylaminoethylacrylate | PAB |
| 10 | glycidyl methacrylate | PAB |
| 11 | isobutylmethacrylate | PAB |
| 12 | cyclohexylmethacrylate | PAB |
| 13 | trimethylolpropane triacrylate | PAB |
| 14 | trimethylolpropane trimethacrylate | 26 |
| 15 | pentaerythritol triacrylate | PAB |
| 16 | pentaerythritol tetraacrylate | PAB |

TABLE 1-continued

| Example | Monomer | Adhesion (N/dm) |
| --- | --- | --- |
| 17 | hydantoin hexacrylate | 33 |
| 18 | 2-vinyl-4,4-dimethylazlactone | PAB |
| 19 | N-vinylpyrrolidone | PAB |

*polyallomer adherend break

EXAMPLES 20 and 21

To 20 mil (0.5 mm) thick polyallomer sheet material was grafted a monomer mixture of 80 parts by weight diethylacrylamide, 20 parts by weight trimethylolpropane triacrylate, and 0.5 parts FC 430 as in Example 1. Cold-rolled mild steel plates (3"×7"×⅛" (7.5 cm×17.5 cm×2.2 cm) Type 1018 available from Paper Calmenson & Co., St. Paul, Minn.) were abraded by hand using Grade 36 sandpaper, followed by Grade 80 sandpaper, and then a Grade 80 abrasive bristle brush, and then degreased with methyl ethyl ketone. The steel plates were then coated with Scotch-Weld ® brand Epoxy Primer 1945, available from Minnesota Mining and Manufacturing Co., at a thickness of about 1-2 mil (0.025-0.05 mm) and allowed to dry for about ten minutes.

In Example 20, Scotch-Weld ® brand Epoxy Adhesive 1838-L B/A Translucent, available from Minnesota Mining and Manufacturing Co. was prepared by mixing equal volumes of base and accelerator. The adhesive was coated on the primed steel plate. The grafted surface of a 1 inch×8 inch piece of the polyallomer was laid over the adhesive as in Example 1 and a second steel plate was placed on top of the polyallomer to effect uniform contact between the polyallomer material and the adhesive. The thus-formed composite was allowed to cure at room temperature (73° F., 23° C.) for three days. The top steel plate was then removed and the composite was soaked in water at room temperature for 13 days When the composite was tested using the 90° peel test as in Example 1, the polyallomer adherend broke before any bond failure occurred.

In Example 21 a composite was prepared and tested as in Example 20 except that the adhesive used was Scotch-Weld ® brand 2216 B/A Structural Adhesive (2 parts by volume base mixed with 3 parts by volume accelerator). Again, the polyallomer adherend broke before any bond failure occurred.

Various modifications and alterations of this invention will be apparent to those skilled in the art without departing from the scope and spirit of this invention and this invention should not be restricted to that set forth herein for illustrative purposes.

We claim:

1. An article comprising a polyolefin first substrate adhered to a second substrate coated with an epoxy adhesive, said polyolefin first substrate having graft-polymerized thereto at least one monomer selected from the group consisting of sulfonic and carboxylic acids and alkyl esters thereof containing fewer than eight carbon atoms in the ester group, amides and mono- and di-substituted amides, alcohols, amines, epoxides, and 5-, 6-, and 7-membered heterocyclic rings having at least one oxygen and/or nitrogen atom in the ring, with the provisos that said monomer contain an ethylenically unsaturated polymerizable moiety and that said graft-polymerized monomers are in a layer less than 5 micrometers in thickness and in contact with said epoxy adhesive.

2. The article of claim 1 wherein the thickness of said graft-polymerized monomer layer is less than about 1 micrometer.

3. The article of claim 1 wherein the thickness of said graft-polymerized monomer layer is less than about 0.5 micrometer.

4. The article of claim 1 wherein said polyolefin first substrate is polyallomer.

5. The article of claim 1 wherein said second substrate is metallic.

6. The article of claim 1 wherein said article has a peel value of at least 25 lb/in (440 N/dm).

7. The article of claim 1 wherein the strength of the bond between said epoxy and said graft-polymerized surface of said polyolefin substrate is greater than the strength of a polyallomer sheet having a thickness of 0.5 millimeter.

8. The article of claim 1 wherein said monomer is acrylic acid, dimethylacrylamide, diethylacrylamide, dipropylacrylamide, hydroxyethylacrylate, cutanedioldiacrylate, hexanedioldiacrylate, diethylaminoethylacrylate, glycidylmethacrylate, isobutylmethacrylate, cyclohexylmethacrylate, trimethylolpropane triacrylate, trimethylolpropane trimethacrylate, pentaerythritol triacrylate, pentaerythritol tetraacrylate, hydantoin hexacrylate, 2-vinyl-4,4-dimethylazlactone or N-vinylpyrrolidone.

9. The article of claim 1 wherein said graft-polymerized monomers are dimethylacrylamide and trimethylolpropane triacrylate.

10. The article of claim 9 wherein said monomers are present in a ratio of about 80 parts by weight dimethylacrylamide to about 20 parts by weight trimethylolpropane triacrylate.

11. The article of claim 10 further comprising a wetting agent in said graft-polymerized layer.

12. An article comprising a polyolefin first substrate adhered to a second substrate with an epoxy resin adhesive, said polyolefin first substrate having graft-polymerized thereto at least one monomr in a layer less than 5 micrometers in thickness, which graft-polymerized monomer contacts said adhesive and provides a 90° peel back value of at least 25 lb/in (440 N/dm).

* * * * *